April 1, 1930.  A. J. ECKELMAN  1,752,522

SPOON HOLDING CLIP

Filed Jan. 12, 1929

Albert J. Eckelman
INVENTOR

BY

ATTORNEY

Patented Apr. 1, 1930

1,752,522

UNITED STATES PATENT OFFICE

ALBERT J. ECKELMAN, OF PORTLAND, OREGON

SPOON-HOLDING CLIP

Application filed January 12, 1929. Serial No. 332,219.

My device relates to cooking utensils and devices and has for its primary purpose the maintaining of the cooking element, as a spoon or fork, in place at the cooking utensil and out of the heat and the device when not in use but at the point of use.

The device is so made to be supported upon the rim of the cooking utensil and having an inwardly projecting lip or rim upon which the body portion of the spoon or fork may be supported.

The device is so made that the stirring element may be supported in an upright position to facilitate drainage for certain uses and for supporting the stirring element in a horizontal position for certain other uses.

A further object of my device is to so support the stirring element within the kettle to prevent the dripping of the material from the spoon upon the stove or table. It is highly desirable that all materials that stick to the stirring element be required to drain back into the kettle. This is particularly true where fatty substances are being cooked, thereby eliminating the fire hazard.

The primary object of my device is for maintaining the stirring element to be used in cooking in place and position upon the cooking utensil, but out of engagement with the material being cooked.

A further object of my device is to maintain the stirring element in position for instant use out of contact with the material being cooked.

With these and incidental objects in view, the invention consists in certain novel features of construction and combination of parts, the essential elements of which are set forth in the appended claims, and to a preferred form of embodiment of which is hereinafter shown with reference to the drawings which accompany and form a part of this specification.

In the drawings.

Like reference characters refer to like parts throughout the several views.

In many of the cooking operations the material is stirred during the cooking by stirring elements that are damaged if immersed in the cooking utensil during the cooking operation. This is particularly true, where the stirring device is made of wood, or fiber. Many times aciduous material is being cooked and spoons made of corrosive materials rapidly disintegrate if permitted to remain in the material being cooked during the cooking process.

Where the cooking utensil is relatively large the stirring elements have a tendency to drop down into the material being cooked.

Figure 1:
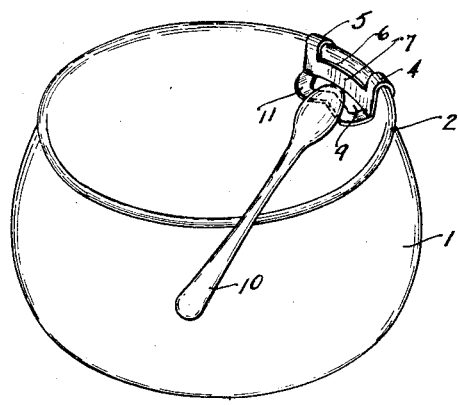
Fig. 1 is a perspective view of a cooking kettle, illustrating one of my devices in position upon the rim of the cooking kettle, with a spoon being supported thereupon and substantially in a horizontal position.
Figure 2:
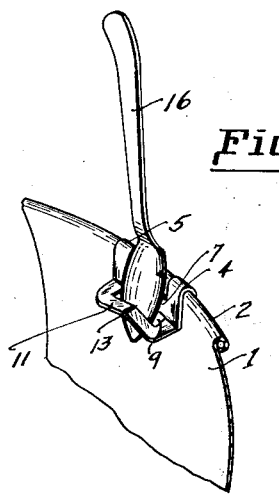
Fig. 2 is a fragmentary, side view, of a cooking kettle, illustrating one of my devices in place and position upon the rim of the kettle, and illustrating the stirring element being supported in an upright position.
Figure 3:
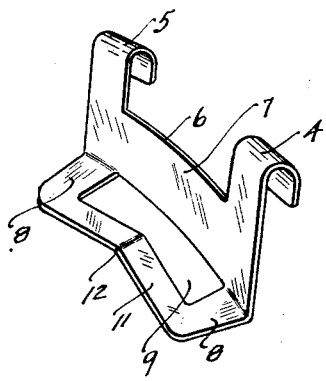
Fig. 3 is a perspective view of the device in preferred embodiment shown removed from the cooking kettle.
Figure 4:
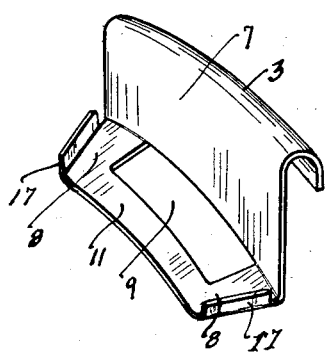
Fig. 4 is a perspective view of the device, illustrated in Fig. 3, but in a slightly modified form.

1 is the cooking utensil having an upper rim 2, to which my device is made to engage. The device may be made of the precious, or semiprecious metals where the same is to be used on the table to prevent the serving spoon, or fork from falling into the receptacle from which the material is to be served. I preferably make my device from sheet material and form a rolled support 3, at its upper edge so that the device may be supported upon the rim of the utensil with which the same is to be used. I have found best results are obtained where the supporting portion of the device is formed of two independently upwardly extending arms 4 and 5, spaced apart and upwardly extending from the upper surface 6 of the body portion 7. A ledge 8 is formed adjacent the lower edge of the body portion and inwardly extend therefrom. A cut out 9, is formed within the ledge, into which the utensil may be made to engage at its point, as illustrated in Fig. 2 to maintain the utensil, as a spoon 10, in an upright position. The cut out also permits the material that drains from the spoon to pass through the opening with a minimum amount of the same becoming deposited upon the ledge thus formed. If the spoon is to be supported in a horizontal position as illustrated in Fig. 1, the spoon will be maintained in a more perfect state of equilibrium if the inner rim portion 11, is bent upwardly as shown at 12 in Fig. 3, and at 13 in Fig. 2.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:

1. In a device of the class described, the combination in a metallic body member of upwardly extending arms disposed at either end of the body member, each arm terminating in a hook like end, a ledge inwardly extending from the body member, said ledge having its front edge upwardly extended to form an inverted V-shape centrally thereof adaptable for limiting the movement of the stirring element placed thereupon and a cut out disposed within the ledge between the body element and the outer rim of the ledge through which the stirring element may be placed to maintain the stirring element in placed position, substantially as shown and described and for the purpose set forth.

2. In a new article of manufacture, a spoon holder comprising a pair of arms parallelly disposed on each side of the main body in spaced relation with each other, said arms having their free ends furcated to form detachably attaching hooks adaptable to being supported by any cooking receptacle, and an outwardly extending ledge disposed substantially at a right angle from the main body, said ledge having its sides separated by a cut-out portion disposed therebetween, and the outer edge being raised at its center to form a retaining hump, substantially as shown and described.

ALBERT J. ECKELMAN.